(12) United States Patent
Geeves et al.

(10) Patent No.: US 6,472,974 B1
(45) Date of Patent: Oct. 29, 2002

(54) SELECTIVE CALL SYSTEM

(75) Inventors: Martin A. Geeves, Great Paxton; Robert A. J. Tuck, Chesterton; Philip E. Tyler, Warburton Lymm, all of (GB)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/252,701

(22) Filed: Feb. 18, 1999

(30) Foreign Application Priority Data

| Feb. 20, 1998 | (GB) | ............................................ 9803501 |
| Jul. 10, 1998 | (GB) | ............................................ 9814879 |
| Oct. 1, 1998 | (GB) | ............................................ 9821251 |

(51) Int. Cl.[7] ........................... G08B 5/22; H04Q 1/30; H04Q 7/28; H04B 7/00; H04L 12/43
(52) U.S. Cl. .................... 340/7.48; 340/7.43; 340/7.52; 455/517; 370/461; 370/341
(58) Field of Search ............................ 340/7.1, 7.21, 340/7.39, 7.48, 7.43, 7.55, 5.1, 7.2, 7.35, 7.52, 7.46; 455/517

(56) References Cited

U.S. PATENT DOCUMENTS

| 5,221,838 A | * | 6/1993 | Gutman et al. ............. 235/379 |
| 5,530,700 A | * | 6/1996 | Tran et al. ................... 370/461 |
| 5,805,077 A | * | 9/1998 | Fawcett ...................... 340/7.21 |
| 5,870,030 A | * | 2/1999 | DeLuca et al. ............. 340/7.48 |
| 5,918,211 A | * | 6/1999 | Sloane ........................... 706/9 |
| 5,923,016 A | * | 7/1999 | Fredregill et al. .......... 235/380 |
| 6,016,107 A | * | 1/2000 | Kampe et al. ............. 340/7.46 |

FOREIGN PATENT DOCUMENTS

| EP | 0821536 A2 | 1/1998 | ............. H04Q/7/24 |
| WO | WO97/31488 | 8/1997 | ........... H04Q/1/100 |

* cited by examiner

Primary Examiner—Michael Horabik
Assistant Examiner—Mai V Nguyen
(74) Attorney, Agent, or Firm—Jack D. Slobod (57) ABSTRACT

A selective call system comprising a primary station (10) and a plurality of secondary stations (12), such as paging receivers, has provision for the primary station sending to a predetermined secondary station a qualifying call from which data, for example loyalty points, can be determined and credited to the user of a secondary station. In one embodiment, the primary station (10) receives the data and compiles a point-to-point qualifying call which includes a field containing the data and the identity code of the predetermined secondary station. Optionally, a security field and a checksum may also be included in the qualifying call compiled. The addressed secondary station (12) decodes the received qualifying call and determines the data which is stored in a non-volatile store (48) which accumulates the items of the data. The user of the secondary station is able to display the data held in the non-volatile store (48) on the secondary station's own display panel (42). The user can spend or exchange some or all of the accumulated specified data and the total held in the non-volatile store (48) is adjusted by an over-the-air message.

3 Claims, 6 Drawing Sheets

SELECTIVE CALL SYSTEM

BACKGROUND OF THE INVENTION

1. Field of the Invention

The present invention relates to using a radio receiving device in a selective call scheme as a means for storing specified data for example loyalty points earned by the user of the device, which points can be exchanged for benefits of any one of a variety of types, and to a method of operating a loyalty program.

2. Description of the Related Art

Loyalty schemes are known in which a user presents a plastics card having the user's personal number to a cashier at a check-out and the cashier swipes the card through a card reader and enters the number of points earned or the amount spent. The points are credited by a central computer to the user. In some loyalty schemes the user is notified of the number of points accumulated by periodically sent statements. When the number of points exceeds an arbitrary number, the user is able to trade the points for some benefit in kind such as a voucher which can be used subsequently in purchasing goods at one of the branches of the store, the issue of a voucher causing the number of points to be reduced by a predetermined amount. Generally speaking, irrespective of the types of plastics card, the user cannot determine at their own volition the number of points which they have accumulated. Consequently, there is insufficient incentive to earn more points by increasing the usage of the card.

BRIEF SUMMARY OF THE INVENTION

An object of the present invention is to have a data transmission system in which specified data relating to a user of the system can be displayed to that user.

Another object of the present invention is to operate a loyalty program which enables points to be accumulated without having to present a plastics card to a check-out.

According to a first aspect of the present invention there is provided a method of operating a selective call system comprising a primary station and at least one secondary station, the method comprising the primary station creating a qualifying call having a characteristic from which a secondary station can determine data, transmitting the qualifying call to an addressed secondary station, and the secondary station using the characteristic in the qualifying call to update data stored in a non-volatile store.

According to a second aspect of the present invention there is provided a selective call system comprising a primary station and at least one secondary station, the primary station comprising means for creating a qualifying call having a characteristic from which a secondary station can determine data, means for encoding and formatting the qualifying call and means for transmitting the qualifying call, and the secondary station comprising means for receiving the qualifying call, means for decoding and deformatting the qualifying call, means for checking if the qualifying call is addressed to the secondary station, means for checking if the call is a qualifying call, means for deriving data using the characteristic in the qualifying call and means for storing the data in a non-volatile store for use by the user.

According to a third aspect of the present invention there is provided a secondary station for use in a selective call system in which a primary station creates and transmits a point-to-point qualifying call having a characteristic from which the secondary station can determine data, the secondary station comprising means for receiving the qualifying call, means for recovering the qualifying call, means for deriving the data using the characteristic in the qualifying call and a non-volatile store for storing the data for use by the user.

According to a fourth aspect of the present invention there is provided a method of operating a loyalty program, comprising the steps of assigning points to transactions, transmitting a points qualifying call to a receiving station held by a user involved in the transaction, determining the number of points from a points qualifying call, accumulating the points in a non-volatile store and rewarding the user by exchanging at least some of the accumulated points for a benefit to the user.

According to a fifth aspect of the present invention there is provided a method of operating a loyalty program on a selective call system comprising a primary station and a plurality of secondary stations, the method including the steps of assigning points to a transaction, the primary station transmitting a points qualifying call to at least one of the secondary stations involved in a transaction, accumulating the points in a non-volatile store of the at least one of the secondary stations, and rewarding a user of the at least one of the secondary stations by exchanging at least some of the accumulated points for a benefit to the user.

By way of the method and system in accordance with the present invention, the user of a secondary station can be informed of the current level of the accumulated data by for example displaying the contents of the non-volatile store.

Various implementations of the method and system in accordance with the present invention are possible. For example the content of the non-volatile store may be credited or debited by over-the-air messages or the content may be overwritten by an updating message. Instead of using a specified data field as the characteristic in the qualifying calls, the identifying indicia of the secondary station may be the characteristic which is used to determine the data which is stored in the non-volatile store.

If desired the qualifying call may include a security field which is used by the secondary station to verify the validity of the data.

BRIEF DESCRIPTION OF THE DRAWINGS

Embodiments of the present invention will now be described, by way of example, with reference to the accompanying drawings, wherein.

In the drawings the same reference numerals have been used to indicate corresponding features.

DETAILED DESCRIPTION OF THE INVENTION

Figure 1:
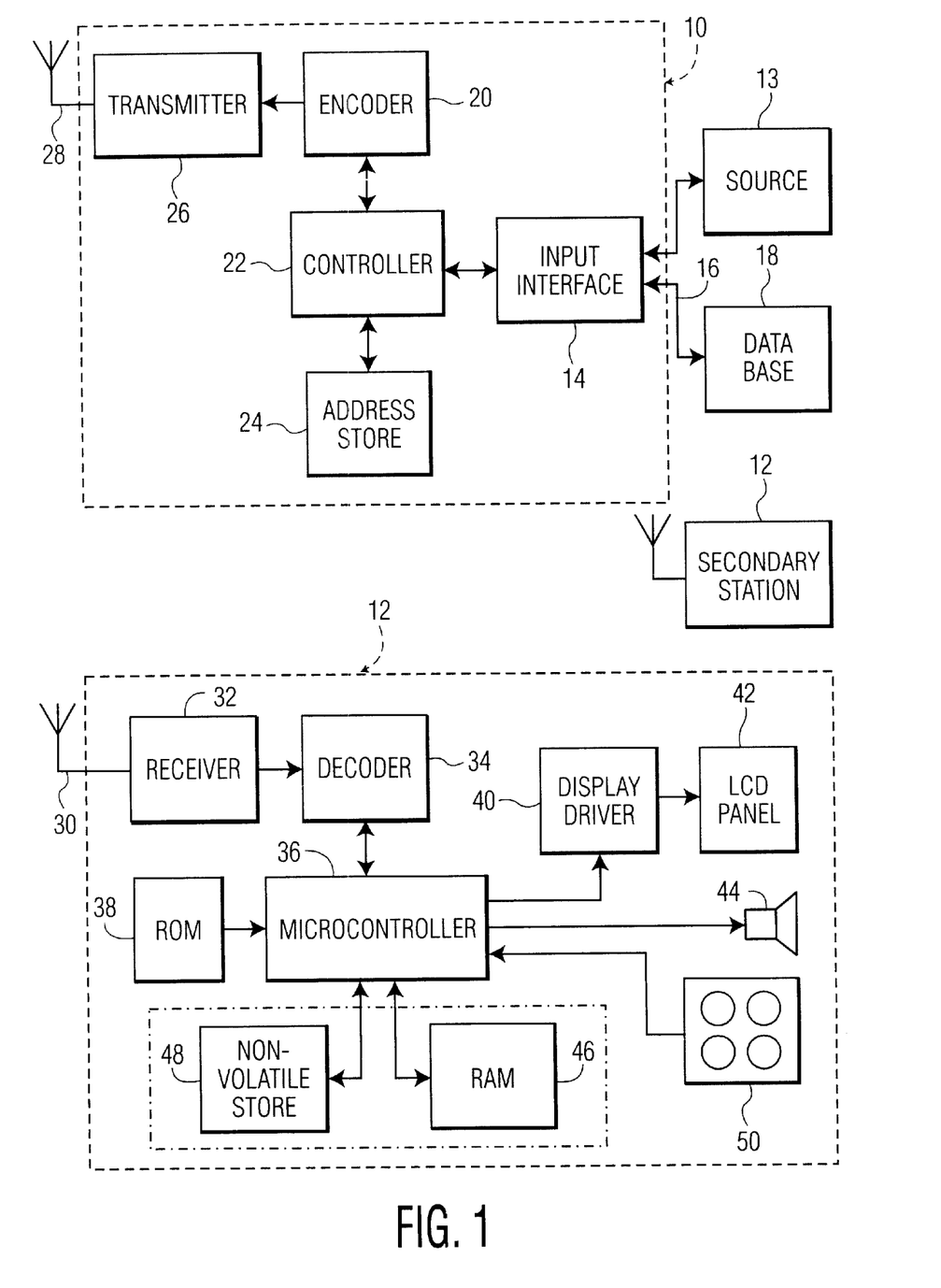
FIG. 1 is a block schematic diagram of a paging system made in accordance with the present invention.

The system shown in FIG. 1 comprises at least one primary station 10 which is fixedly sited and a plurality of transportable devices or secondary stations 12 of which one is shown in detail. The primary station 10 comprises an input interface 14 which has an input for numeric and/or alpha-numeric messages generated by a source 13 and a second input coupled by a land line 16 to an external data base 18 which originates indicia indicative of the number of loyalty points to be credited or debited. Input information to the input interface 14 is encoded, optionally interleaved and/or encrypted, and formatted in an encoder 20 under the control of a controller 22. The data may be formatted in accordance with a known type of paging signal protocol such as the CCIR Radio Paging Code No. 1 (alternatively known as POCSAG). In accordance with the POCSAG protocol, the address of a secondary station 12 to which the encoded message is to be sent is appended to the front of the message. The addresses of all the pagers operating on the system are stored in an address store 24. The encoded and formatted message is supplied to a transmitter 26 from where it is propagated by way of an antenna 28 as a point-to-point downlink signal.

The illustrated secondary station 12 comprises an antenna 30 coupled to a receiver 32. An output of the receiving stage] receiver 32 is coupled to a decoder 34 which decodes and, if appropriate, decrypts the received signal and passes its output to a microcontroller 36. Optionally, the decoder 34 may be omitted and the decoding operation is done in software in the microcontroller 36. The microcontroller 36 is operated in accordance with a program stored in a read-only memory ("ROM") 38. The microcontroller 36 has outputs coupled to a display driver 40 of a liquid crystal display ("LCD") panel 42, to an annunciating device as represented by a loudspeaker 44, to a random access memory ("RAM") 46, for example an E²PROM, for storing numeric and alpha-numeric messages and to a non-volatile store 48, for example an E²PROM or a RAM with a back-up battery, for storing and data, such as loyalty points, which stored data can be altered by messages relayed from the data base 18 via the transmitter 26. A man/machine interface comprising a keypad 50 is connected to the microcontroller 36.

The basic operation of the secondary station 12 acting as a message pager for numeric and alpha-numeric messages is well known in the art and will not be described in detail. However, for the sake of completeness, a reference is made to the "Book of the CCIR Radio-Paging Code No. 1" issued by the Secretary, Radio Paging Code Standards Group, British Telecom, London.

If the system operator wishes to encourage the sending of pager messages by awarding loyalty points to the user, a number of methods may be used, for example the number of points to be awarded is determined by the data base 18 and is included in the point-to-point message sent or a point or points are awarded based on the sending or receiving of a paging message which constitutes a qualifying call.

In an example of where a dedicated message is sent, the secondary station 12 is energized in accordance with the battery economising protocol of the paging system and on receiving a transmission at the receiver 32, it is decoded in the decoder 34 and a check is made that the message is addressed to this particular secondary station 12. Assuming that it is, the message is stored in the RAM 46 and the points indicated in the decoded message are stored in the non-volatile store 48 by the microcontroller 36. Optionally, the RAM 46 and the non-volatile store 48 may be combined as shown by the chain-dot lines. A user operating the keypad 50 is able to interrogate the non-volatile store 48 and have the total number of points and, optionally a statement of the transactions, displayed on the LCD panel 42.

If the user wishes to spend or exchange some or all of the accumulated loyalty points, he or she contacts the data base 18 which deducts the points in its computer and formulates an over-the-air message which in one embodiment contains the number of points to be incremented and decremented and in another embodiment contains the new total number of points which are to be stored in place of the current number of points. The over-the-air message is sent as a point-to-point message to the selected secondary station 12 and after decoding causes the microcontroller 36 to either deduct points from the total in the non-volatile store 48 or substitute the new total for the old total. The spending or exchanging of points is normally carried at a bureau or office of, or authorised by, the system operator.

In one embodiment of the present invention in which the points are incremented or decremented, the non-volatile store 48 comprises a 16 bit binary counter (not shown) storing up to 65,535 points. When the counter reaches its maximum value it will not accept any more credits. Points capacity is created in the counter by spending or exchanging points. Access to this counter is restricted to avoid fraud and generally speaking the only exception is by programming equipment when operating as part of the manufacturing process. In a non-illustrated variant, when the counter reaches its maximum or other predetermined level, a proportion of the count is stored and the display shows the amended figure and includes a flag indicating that points have been stored.

Figure 2:
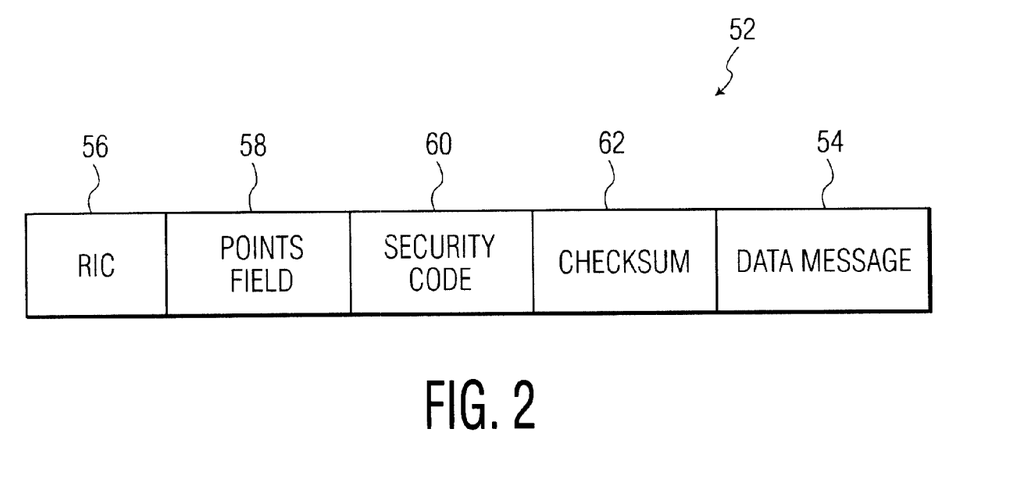
FIG. 2 is a diagram illustrating one form of a message including loyalty points to be credited to an addressed secondary station in accordance with the present invention.

FIG. 2 illustrates an example of a secure message 52 giving or crediting points to a specified pager. A data message 54 proper has a preamble comprising a number of code words or fields beginning with a radio identity code ("RIC") 56 and followed by a points field 58 giving the number of points to be credited, a security code 60 and lastly a checksum 62 on the fields 58, 60.

In one example the fields 58, 60, 62 comprise a total of 35 bit points which number is sufficiently large as to stop casual abuse of the system. More particularly the points field 58 comprises 10 bits for transmitting the points value which may be in the range zero to 1000, the security code field 60 comprises 18 bits and the checksum field comprises 7 bits. The bits in the fields 58, 60 and 62 may be scrambled, for example interleaved, to provide additional security.

The secondary station 12 will accept the points in the secure message 52 addressed to it if the checksum 62 is valid and/or the security code 60 is correct. In the case of the checksum 62 as received being invalid, but the points field 58 being error free, counting on the secondary station 12 is locked until the primary station 10 transmits an over-the-air control message which is used by the secondary station 12 to clear the points in the non-volatile store 48.

The security code 60 in the secure message 52 is altered in a predetermined way which is known to the primary station 10. For example the security code 60 could be linked to a clock or a message counter in order to generate the incrementing code necessary to change the security code after each transmission. The secondary station 12 on receiving and decoding a secure message 52 checks that the security code 60 is different in a predetermined manner, for example higher, than the currently stored code. In the event of the incremented code being a lower value because for example the code has recycled or overflowed from a high value to a low value, then when the next secure message 52 is received, a check is made that the security code 60 had previously increased for each of the previously received four (4) secure messages 52. If this is the case, then the low value is stored by the secondary station 12.

Figure 3:
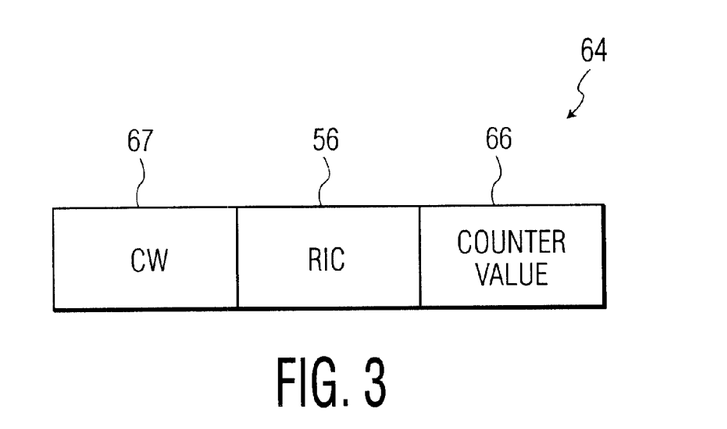
FIG. 3 is a diagram illustrating a message instructing the debiting of loyalty points from the current balance stored by an addressed secondary station in accordance with the present invention.

FIG. 3 shows an example of an over-the-air control message 64 which is used to write an absolute points value in the non-volatile store 48 as long as the adjustment reduces the points total. The control message 64 comprises a 4 bit command word ("CW") 67 having a value 1011, the RIC 56 of the addressed secondary station 12, and a counter value 66 of 16 bits.

Figure 4:
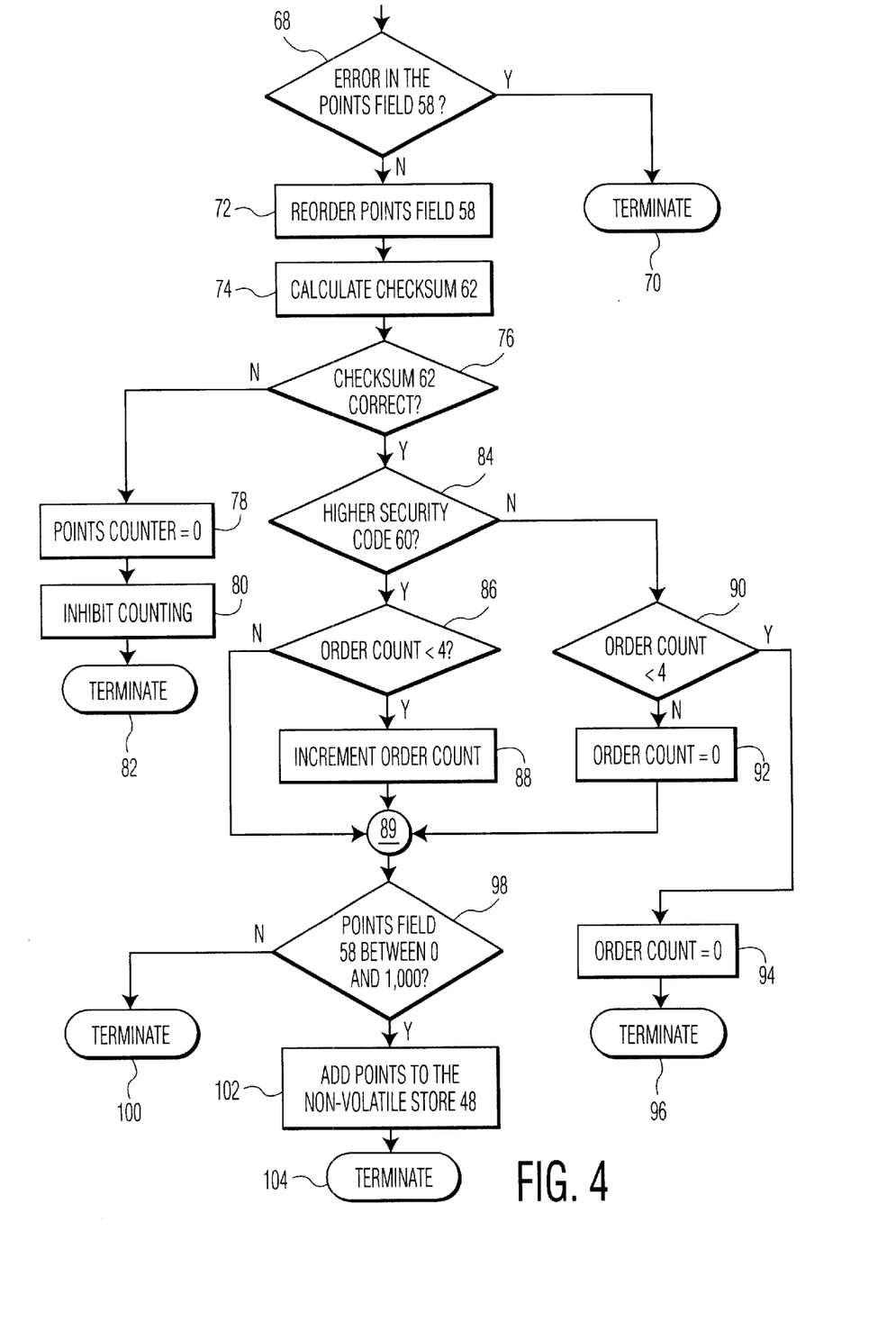
FIG. 4 is a flow chart showing the steps of incrementing the points stored in the secondary station using the messages shown in FIGS. 2 and 3 in accordance with the present invention.

FIG. 4 is a flow chart illustrating the operations for determining if a secure message 52 (FIG. 2) is received correctly and incrementing the points in the non-volatile store 48.

It is assumed that a message has been received and decoded but not error checked. Block 68 relates to checking if there are any errors in the points field 58. If the answer is Yes (Y), then block 70 represents the operation of ignoring the points and terminating further analysis of the fields in the secure message 52. However, if no (N) errors are found, then in block 72 the bits in the points field 58 are reordered, for example, de-interleaved. Block 74 denotes the calculation of the checksum 62 and block 76 denotes checking if the received checksum 62 is correct. If the answer is No (N), in block 78 the points counter is changed to zero. Block 80 denotes inhibiting the counting of points by the secondary station 12 and the block 82 indicates the ignoring of the points stored and terminating the operation. If the answer in the block 76 is Yes (Y), in block 84 a check is made that the security code 60 is higher than the previous security code. If the answer is Yes (Y), then in block 86 a check is made that the order of count is less than 4. If the answer is No (N), then the flow chart proceeds to a node 89. If the answer is Yes (Y), then in block 88 the order of the count is incremented and the flow chart proceeds to node 89.

If the answer to the block 84 is No (N), then a check is made in the block 90 to see if the order of count is less than 4. If the answer is No (N), then in block 92 the order count is set to zero and the flow chart proceeds to the node 89. If the answer to the block 90 is Yes (Y), then in block 94 the order count is set to zero and in block 96 the points are ignored and the process is terminated. From the node 89 the flow chart proceeds to the block 98 in which a check is made to see if the points are in the range 0 to 1,000. If the answer is No (N), the flow chart proceeds to the block 100 which denotes ignoring the points and terminating further processing. However, if the answer in the block 98 is Yes (Y), the flow chart proceeds to the block 102 which indicates the operations of adding the newly received points to those already in the points the non-volatile store 48 (FIG. 1) and replacing the previously stored security code with the newly received security code 60. Thereafter the operation is terminated in block 104.

In a second embodiment, the external data base 18 (FIG. 1) stores the master or definitive number of points for each secondary station and the non-volatile store 48 is altered by overwriting the current number of points by a new number contained in an over-the-air message which will have a format similar to the over-the-air message 64 shown in FIG. 3. However, unlike its previously described use in only reducing the number of points, this message is used to over-write the contents of the non-volatile store 48 with a new total. This embodiment is a simpler version of that described with reference to FIGS. 2 to 4 in that a high level of security is not required in the over-the-air messages 64 because the user accepts that the definitive number of points is stored in the external data base 18 and the number shown on the LCD panel 42 may be erroneous due to a message having been lost. However if a higher level of security is required then a security code 60 and/or checksum 62 can be included in the over-the-air messages 64.

In this embodiment in order to facilitate the use of the secondary station 12, a dedicated icon is used as a means to access the points total in the non-volatile store 48. The secondary station 12 has a user interface comprising several menus which typically requires a user to cycle through or skip selected sequentially presented menus, each menu comprising sub-menus, to select points of interest. The icon, when programmed, appears on a menu associated with the message store and when flashing, the user can actuate an appropriate key on the keypad 50 (FIG. 1) and the points are displayed on the LCD panel 42, for example as a five digit total. Actuating a key of the keypad 50 or a time-out causes the screen to erase and return to a default condition.

In the case of having a five digit display, two bytes, totalling 16 bits are required in the non-volatile store 48. However, in the event of a predetermined maximum number of points, say 50,000 points, being exceeded, then the 50,000 points are displayed and the excess is ignored.

Optionally, in a non-illustrated embodiment, the first 50,000 points are stored and the excess is displayed together with a flag showing that other points are stored but not displayed.

Figure 5:
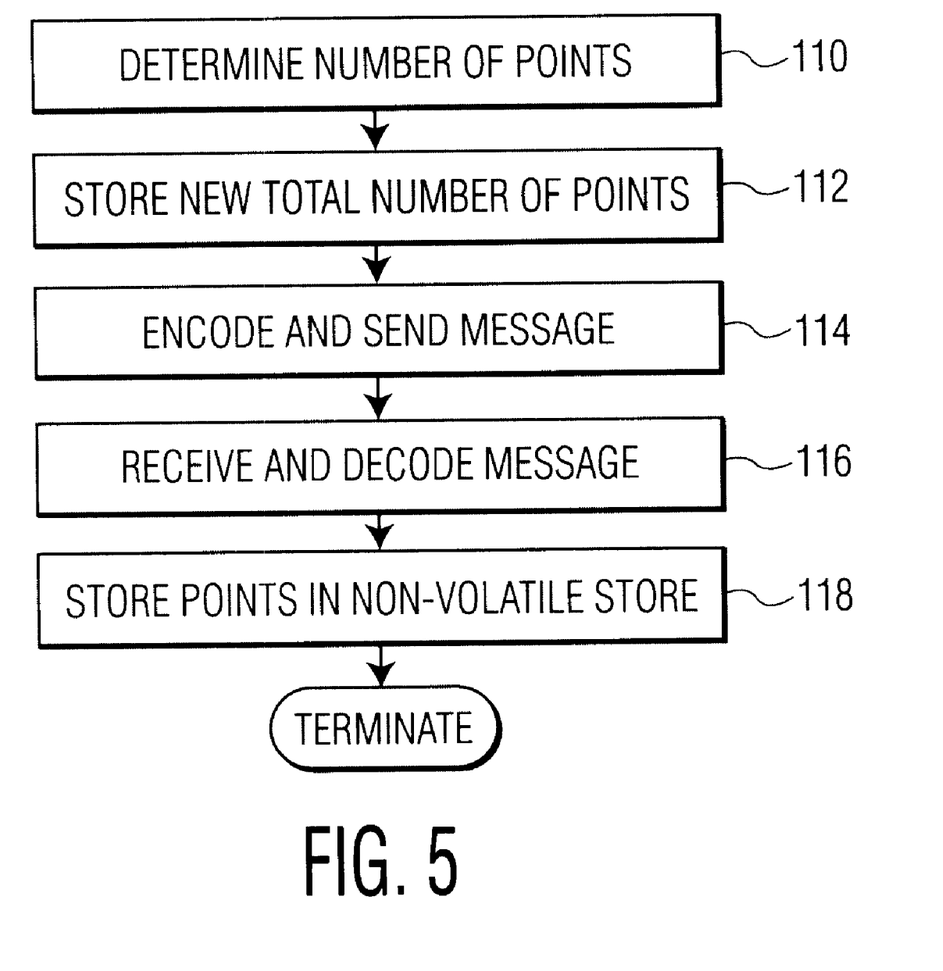
FIG. 5 is a flow chart showing the steps involved with notifying a secondary station of a new total number of loyalty points in accordance with the present invention.

FIG. 5 illustrates a flow chart associated with the external data base 18 (FIG. 1) determining, and notifying a secondary station 12 of, a new total number of loyalty points. Block 110 denotes the data base 18 determining the number of points following a debit or credit transaction involving a user. Block 112 denotes the data base 18 storing the new total number of points as the definitive value for that user. Block 114 denotes the primary station 10 encoding and sending a point-to-point message to the user's secondary station 12. Block 116 denotes the secondary station 12 recovering the points message from the received transmission, which points are stored in the non-volatile store 48 during block 118.

Figure 6:
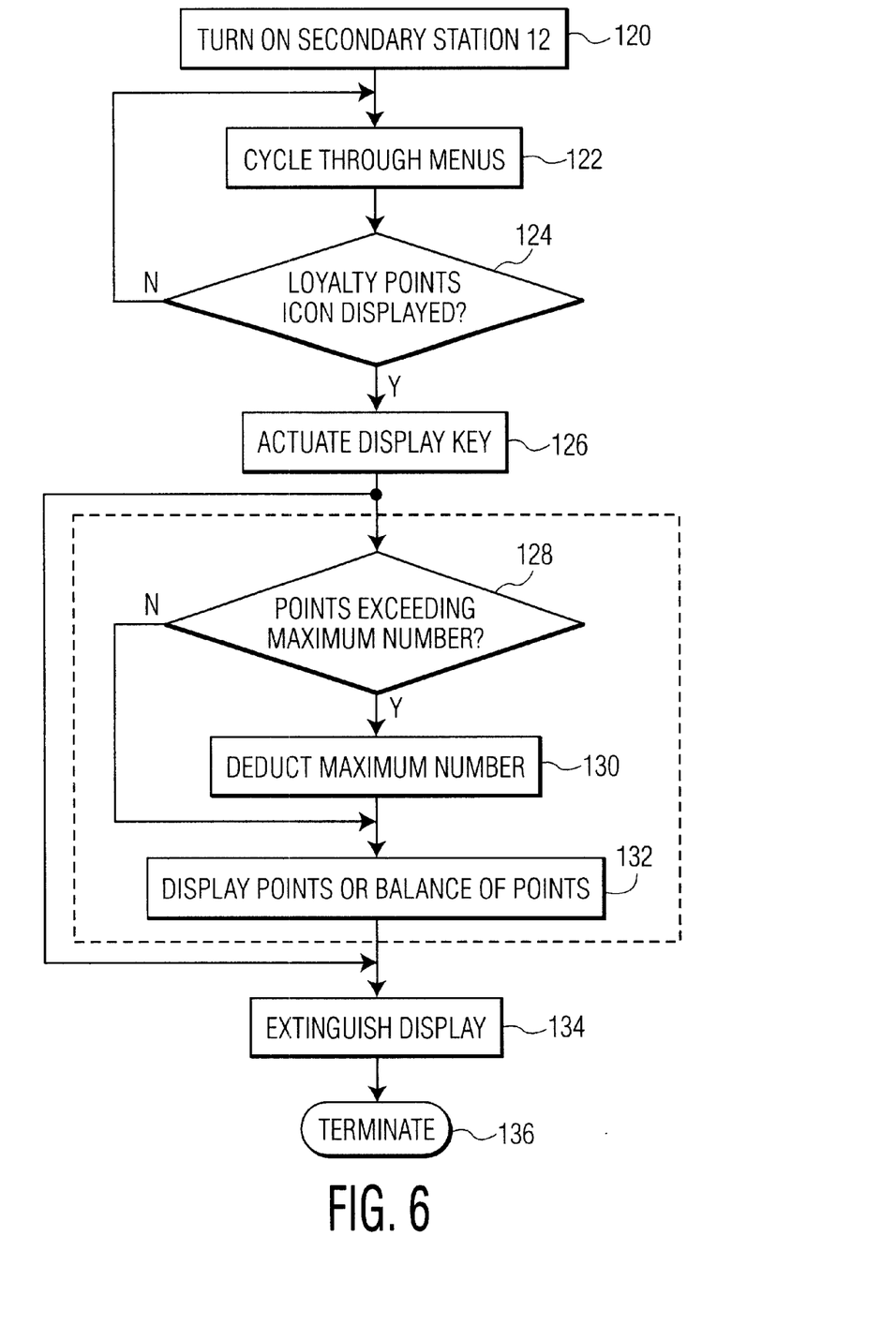
FIG. 6 is a flow chart showing the steps associated with a user checking-up on the number of points stored in his/her secondary station in accordance with the present invention.

FIG. 6 is a flow chart of a sequence of operations associated with a user checking-up on the number of points stored. Block 120 denotes the user switching-on his/her secondary station 12. Block 122 denotes the user cycling through the menus of the user interface of the secondary station 12. Block 124 denotes the user checking to see if a loyalty points icon is being displayed. If the answer is No (N), the flow chart reverts to the block 122. Alternatively, if the answer is Yes (Y), block 126 denotes the user actuating a key of the keypad to display the number of points. Block 134 denotes the points display being extinguished due to it being switched-off by actuation of a key of the keypad or being timed-out. Block 136 denotes the end.

Optionally, in the event of the secondary station 12 being able to store more than say 50,000 points, then the flow chart is modified by the extra steps 128 to 132 as shown in the broken line box. In block 128, a check is made to see if the number stored exceeds a maximum number which can be displayed, say 50,000 points. If the answer is Yes (Y), then in block 130 the said maximum number is deducted and in block 132, the balance is displayed, if necessary with a flag indicating that extra points are being stored but not shown. If the answer in the block 128 is No (N), the number of points is displayed as denoted by the block 132.

In a third embodiment of the present invention, the address of the secondary station 12, that is, its RIC, serves a dual purpose of firstly its normal function of identifying the secondary station to which a point-to-point message is directed and secondly to be used to generate loyalty points which are added to the total in the non-volatile store 48.

Figure 7:
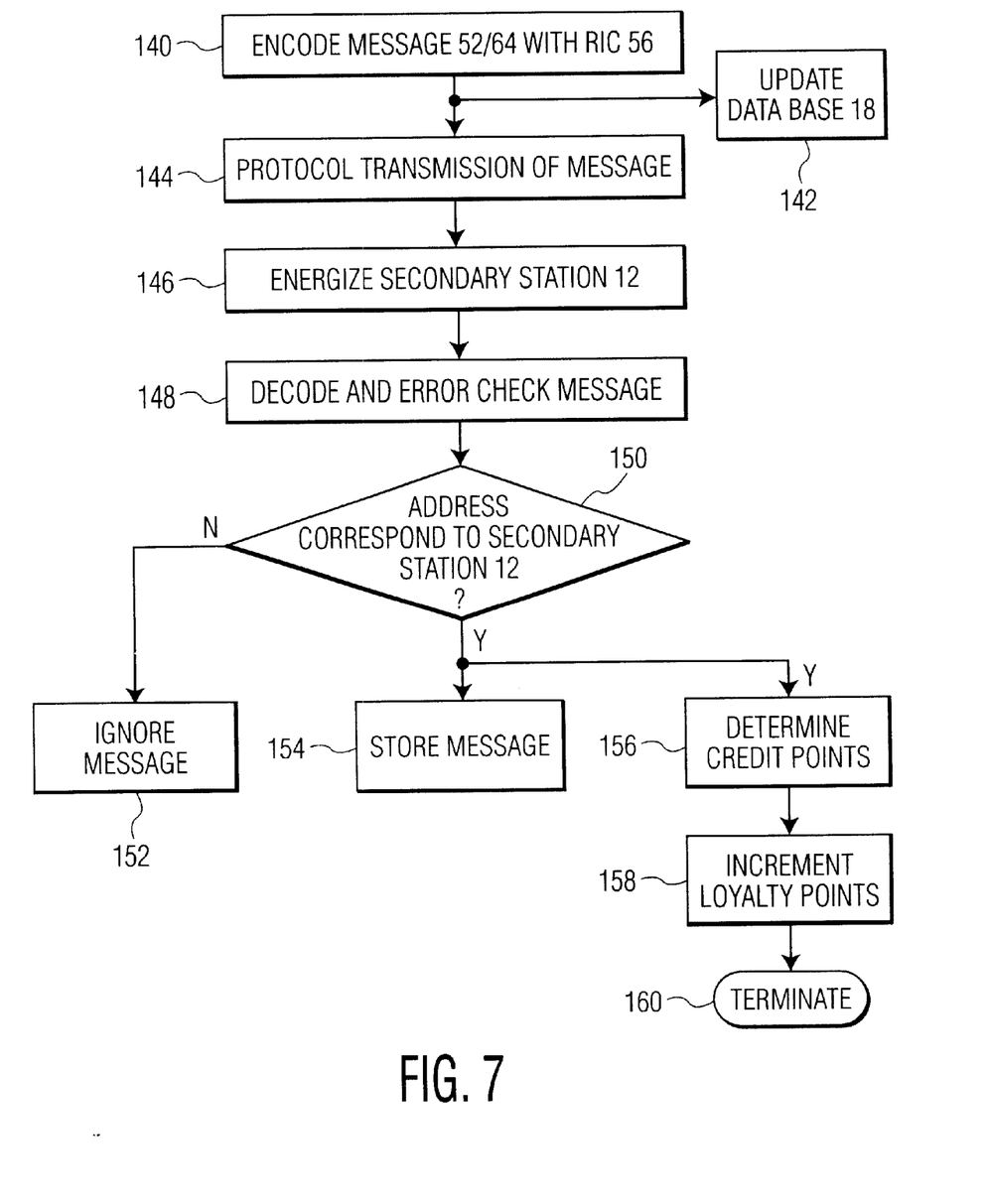
FIG. 7 is a flow chart showing the steps involved in deriving loyalty points from the address of the secondary station in accordance with the present invention.

The flow chart shown in FIG. 7 illustrates the steps when implementing this embodiment. Block 140 indicates the creation of an encoded message 52 or 64 (FIG. 2) and adding the RIC 56 to form a point-to-point message. Block 142 indicates updating the number of loyalty points stored by the external data base 18 (FIG. 1) in respect of the user as identified by the RIC 56. Block 144 indicates the transmission of the point-to-point message in accordance the protocol pertaining to the system's operation.

Block 146 indicates a secondary station 12 being energized in accordance with the applicable battery economising protocol to receive any messages. Block 148 indicates decoding and error checking at least the address code word contained in the or each message received. Block 150 denotes checking if the address corresponds to one allocated to the secondary station 12. If the answer is no (N), then the message is ignored as denoted by a block 152. If the answer is yes (Y), block 154 denotes storing the decoded message in the message store, that is, the RAM 46 (FIG. 1). Also block 156 denotes the number of points to be credited. Block 158 denotes incrementing the total number of loyalty points store in the points store, that is the non-volatile store 48 (FIG. 1). Finally block 160 indicates that the process is ended.

In order to spend the loyalty points, the secondary station 12 is taken to a shop, bureau or office of, or authorised by, the system operator. In the event of s there being a discrepancy between the number of points stored against the secondary station's user name in the external data base 18 and those stored in the non-volatile store 48, the total in external data base 18 will be assumed to be the definitive value as it is possible that messages to the secondary station 12 have been lost in transmission due, for example, the existence of a fade. Fraud by the user of the secondary station 12 and/or malfunction of the secondary station 12 can be detected if the number of loyalty points stored by the nonvolatile store 48 exceeds the total stored by the data base 18.

Although the present invention has been described with reference to a selective call system, it may be applied to other systems such as cordless and cellular telephone systems.

From reading the present disclosure, other modifications will be apparent to persons skilled in the art. Such modifications may involve other features which are already known in the design, manufacture and use of selective call systems and component parts thereof and which may be used instead of or in addition to features already described herein.

What is claimed is:

1. A method of operating a selective call system including a primary station and a secondary station, said method comprising:

operating the secondary station to receive a first qualifying call from the primary station, the first qualifying call having a characteristic from which the secondary station determines a first set of data;

operating the secondary station using the characteristic in the first qualifying call to update a second set of data stored in a non-volatile store of the secondary station when a checksum of the first qualifying call is valid;

operating the secondary station to reset the non-volatile store when the checksum of the first qualifying call is invalid;

operating the secondary station to receive a second qualifying call from the primary station when the checksum is invalid, the second qualifying call having a characteristic from which the secondary station determines a third set of data; and operating the secondary station using the characteristic in the second qualifying call to store the third set of data in the non-volatile store.

2. A selective call system, comprising:

a primary station; and a secondary station including a non-volatile store, wherein said secondary station is operable to receive a first qualifying call from said primary station, the first qualifying call having a characteristic from which said secondary station determines a first set of data, wherein said secondary station is further operable to use the characteristic in the first qualifying call to update a second set of data stored in said non-volatile store when a checksum of the first qualifying call is valid;

wherein said secondary station is further operable to reset said non-volatile store when the checksum of the first qualifying call is invalid, wherein said secondary station is further operable to receive a second qualifying call from said primary station when the checksum is invalid, the second qualifying call having a characteristic from which said secondary station determines a third set of data, and wherein said secondary station is further operable to use the characteristic in the second qualifying call to store the third set of data in said non-volatile store.

3. A secondary station employed within a selective call system further including a primary station, said secondary station comprising:

a non-volatile store;

means for receiving a first qualifying call from the primary station, the first qualifying call having a characteristic from which said secondary station determines a first set of data;

means for utilizing the characteristic in the first qualifying call to update a second set of data stored in said non-volatile store of said secondary station when a checksum of the first qualifying call is valid;

means for resetting said non-volatile store when the checksum of the first qualifying call is invalid;

means for receiving a second qualifying call from the primary station when the checksum is invalid, the second qualifying call having a characteristic from which said secondary station determines a third set of data; and means for utilizing the characteristic in the second qualifying call to store the third set of data in said non-volatile store.

* * * * *